US012032739B2

(12) United States Patent
Luijten et al.

(10) Patent No.: US 12,032,739 B2
(45) Date of Patent: Jul. 9, 2024

(54) VIRTUAL REALITY WEARABLE SYSTEM

(71) Applicant: Adjuvo Motion B.V., Delft (NL)

(72) Inventors: Johannes Luijten, Delft (NL); Gijs den Butter, Delft (NL); Cornelis Peter Bogerd, Delft (NL); Max Lammers, Delft (NL); Johanna Margaretha Wilhelmina Hermans, Delft (NL); Daniel Shor, Delft (NL)

(73) Assignee: Adjuvo Motion B.V., Delft (NL)

( * ) Notice: Subject to any disclaimer, the term of this patent is extended or adjusted under 35 U.S.C. 154(b) by 0 days.

(21) Appl. No.: 18/153,278

(22) Filed: Jan. 11, 2023

(65) Prior Publication Data

US 2023/0141201 A1 May 11, 2023

Related U.S. Application Data

(63) Continuation of application No. PCT/NL2021/050420, filed on Jul. 2, 2021.

(30) Foreign Application Priority Data

Jul. 15, 2020 (NL) ..................................... 2026062

(51) Int. Cl.
*G06F 3/01* (2006.01)
(52) U.S. Cl.
CPC .............. *G06F 3/014* (2013.01); *G06F 3/016* (2013.01)
(58) Field of Classification Search
CPC . G06F 3/014; G06F 3/016; G06F 1/00; G06F 3/00; G06F 5/00; G06F 7/00;

(Continued)

(56) References Cited

U.S. PATENT DOCUMENTS 5,842,277 A 12/1998 Haeberlein et al.
6,128,004 A 10/2000 McDowall et al.
(Continued)

FOREIGN PATENT DOCUMENTS

CN 107212492 A 9/2017
KR 20190036167 A 4/2019
WO 2022015160 A1 1/2022

*Primary Examiner* — Chun-Nan Lin
(74) *Attorney, Agent, or Firm* — Peacock Law P.C.; Justin R. Muehlmeyer; Justin R. Jackson

(57) ABSTRACT

A virtual reality wearable system. The system includes a sensor, an actuator, a sleeve-type first wearable part fittable over a user's bodily part, the at least one second wearable part being wearable over the first wearable part. The first wearable part and the second wearable part are releasably connectable to each other. The at least one second wearable part supports the sensor and the actuator. A cable or cables connect the sensor and the actuator with a portion of the second wearable part distant from the sensor and the actuator. The at least one second wearable part comprises a first portion and a second portion that are separate from each other. The first portion is placeable on a first bodily part of a user, and said first portion supports the sensor and the actuator, and the second portion is placeable on a second bodily part of the user distant from the first bodily part. The cable or cables extend without connection to the first wearable part from the sensor and the actuator on the first portion of the second wearable part to the second portion of the second wearable part.

7 Claims, 7 Drawing Sheets

(58) Field of Classification Search
CPC ... G06F 8/00; G06F 9/00; G06F 11/00; G06F 12/00; G06F 13/00; G06F 15/00; G06F 16/00; G06F 17/00
See application file for complete search history.

(56) References Cited

U.S. PATENT DOCUMENTS

| | | |
|---|---|---|
| 11,656,684 B2 * | 5/2023 | Xiong .................... G06F 3/016 345/156 |
| 2016/0051382 A1 | 2/2016 | Goldfarb et al. |
| 2019/0101983 A1 * | 4/2019 | Cohen ................ A61B 5/6806 |
| 2019/0204921 A1 * | 7/2019 | Goupil .................... G06F 3/016 |
| 2020/0022433 A1 | 1/2020 | Lu et al. |

\* cited by examiner

VIRTUAL REALITY WEARABLE SYSTEM

CROSS-REFERENCE TO RELATED APPLICATIONS

This application is a continuation of International Patent Application No. PCT/NL2021/050420, titled "A Virtual Reality Wearable System", filed on Jul. 2, 2021, which claims priority to and the benefit of Netherlands Patent Application No. 2026062, titled "A Virtual Reality Wearable System", filed on Jul. 15, 2020, and the specification and claims thereof are incorporated herein by reference.

BACKGROUND OF THE INVENTION

Field of the Invention

The invention relates to a virtual reality wearable system comprising a wearable part provided with at least one of a sensor and an actuator. The sensor and the actuator are connectable to a processor for receiving and processing data from the sensor and for driving the actuator so as to complete the virtual reality system.

Background Art

U.S. Pat. No. 6,128,004 discloses a data input glove for use with a computer system, virtual reality system or the like, with numerous electrodes placed on the glove and interconnected with electronic controls enabling sensing of contact between any combination of the electrodes, with electrodes are made of flexible electrically conductive fabric, silk-screened electrically conductive paint or the like.

KR 2019 0036167 discloses a virtual reality glove provided with a base glove, wherein an upper cover and a lower cover are detachably coupled to the base glove. The upper cover and the lower cover are each provided with sensors, the signals of which may be wireless communicated to other parts of a virtual reality system.

US2019/204921 discloses a haptic feedback glove with an inner glove made of a flexible material, thimbles over each finger and thumb, and tendons coupled to each finger thimble. One or more actuators may be connected to each tendon, so that the tendons may be used to apply pressure to the fingers. Tactors in the finger thimbles and on palm panels may also be used to provide haptic feedback.

US2019/101983 discloses a virtual reality wearable system in accordance with the preamble of claim 1, comprising a sensor and an actuator, and comprising a sleeve-type first wearable part fittable over a user's bodily part, and at least one second wearable part wearable over the first wearable part, wherein the first wearable part and the second wearable part are releasably connectable to each other, and wherein the at least one second wearable part supports the sensor and the actuator, and a cable or cables connect the sensor and the actuator with a portion of the second wearable part distant from the sensor and the actuator. The cable or cables are guided through pathways that connect the cable or cables to the first wearable part that in use is fitted as a sleeve over a user's hand.

A problem with such a virtual reality glove system, or in general with a virtual reality wearable system, comprising a wearable part with a sensor and an actuator occurs or arises when cleaning of the wearable part is required. This is hindered or even impossible because of the sensor and actuator that are usually embedded in or connected to the wearable part, as is demonstrated by US2019/101983.

The invention provides a solution for this problem.

Another problem that the invention addresses is to provide the user with tactile feedback.

Note that this application refers to a number of publications, which references should not be considered an admission that such is prior art for purposes of patentability.

BRIEF SUMMARY OF THE INVENTION

Embodiments of the present invention are directed to a virtual reality wearable system comprising the features of one or more of the appended claims.

In one embodiment, the wearable system of the present invention comprises at least one second wearable part comprising a first portion and a second portion that are separate from each other, wherein the first portion is placeable on a first bodily part of a user, and said first portion supports the sensor and the actuator, and the second portion is placeable on a second bodily part of the user distant from the first bodily part, wherein the cable or cables extend without connection to the first wearable part from the sensor and the actuator on the first portion of the second wearable part to the second portion of the second wearable part, and that an electronic device is positioned on the at least one second wearable part, wherein the cable or cables are electrically conducting and said electronic device is electrically connected to the cable or cables so as to power the electronic device).

This makes possible that removal of the second wearable part with the sensors, actuators and cables from the first wearable part and subsequent cleansing of the first wearable part is possible, without negatively affecting the sensors or actuators that form part of the at least one second wearable part. Since the at least one second wearable part is wearable over the first wearable part, the need to cleanse the virtual reality wearable system is basically restricted to the first wearable part which is in direct contact with the user. Further, one of the benefits of the cables is that an electronic device may be positioned on the at least one second wearable part, and that with the cable or cables being electrically conducting, it is possible that the electronic device is electrically connected to the cable or cables so as to power the electronic device.

It is remarked that wherever in the specification reference is made to an actuator, this also covers the application of an (electromechanical) brake. With the cable or cables connected exclusively to the detachable second wearable part, several beneficial options come into reach, as will be explained hereinafter. Most importantly though is to note that the cables support the transfer of forces between opposite ends of the cables in what effectively constitutes a minimal exoskeleton-arrangement that the wearable system of the invention provides.

In the virtual reality wearable system of the invention the at least one second wearable part comprises a first portion and a second portion, wherein the first portion is placeable on a bodily part of a user, and said first portion supports the sensor and the actuator, wherein the second portion is also placeable on a bodily part of the user, wherein the cable or cables extend from the sensor and the actuator on the first portion to the second portion of the second wearable part. The wearable system of the invention can thus be applied on different parts of the human body and thus act as an exoskeleton. In one example the wearable system can be placed on a user's arm, at opposite sides of the user's elbow. The cables can then be effectively used to assist in flexing of the user's arm.

In another embodiment the at least one second wearable part comprises a first portion and a second portion, wherein the first portion is placeable on the back of a user's hand and said first portion supports the sensor and the actuator, and the second portion is placeable on a finger or fingers of the user's hand, wherein the cable or cables extend from the sensor and the actuator on the first portion to the second portion, and connect to the second portion near to a location where in use a fingertip of the user is positioned. Through the cable or cables the sensor can thus accurately detect flexion of the finger or fingers, whereas the actuator can be used to provide sensory feedback to the finger or fingers of the user.

It is further preferable that the first wearable part and the at least one second wearable part are provided with cooperating attachment parts to enable the (repeated) releasable attachment of the first wearable part and the second wearable part to each other. The cooperating attachment parts can be implemented in Velcro or with magnets, but these are not the only options.

In a preferred embodiment, the cooperating attachment parts comprise protrusions and recesses that are both dimensioned to snugly fit into each other.

An effective lock-tight connection between the respective wearable parts is secured by arranging that the cooperating attachment parts provide a shape-locked connection between said parts.

In another aspect of the invention, the cooperating attachment parts are provided with guiding grooves for receiving and slidably guiding the cables. This promotes the reliability of the design, which may otherwise be particularly a challenge when repeatedly assembling and disassembling the wearable system of the invention.

It is further preferred that in an embodiment for use on the user's hand, the first wearable part and the at least one second wearable part comprise straps arranged for fitting around part of the user's hand. This promotes the secure placement of the wearable system of the invention.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The invention will hereinafter be further elucidated with reference to the drawings of different exemplary embodiments of a virtual reality wearable system according to the invention that is not limiting as to the appended claims. One of the embodiments relates to the wearable system being construed as a glove system, but the invention is clearly not restricted thereto. Instead of a glove system, the invention can also be embodied in a shoe system, a trouser system, or any other wearable system having the features of the main claim. This also follows from the other exemplary embodiment that will be discussed hereinafter and that relates to a minimal exoskeleton wearable system to be placed on a user's arm.

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
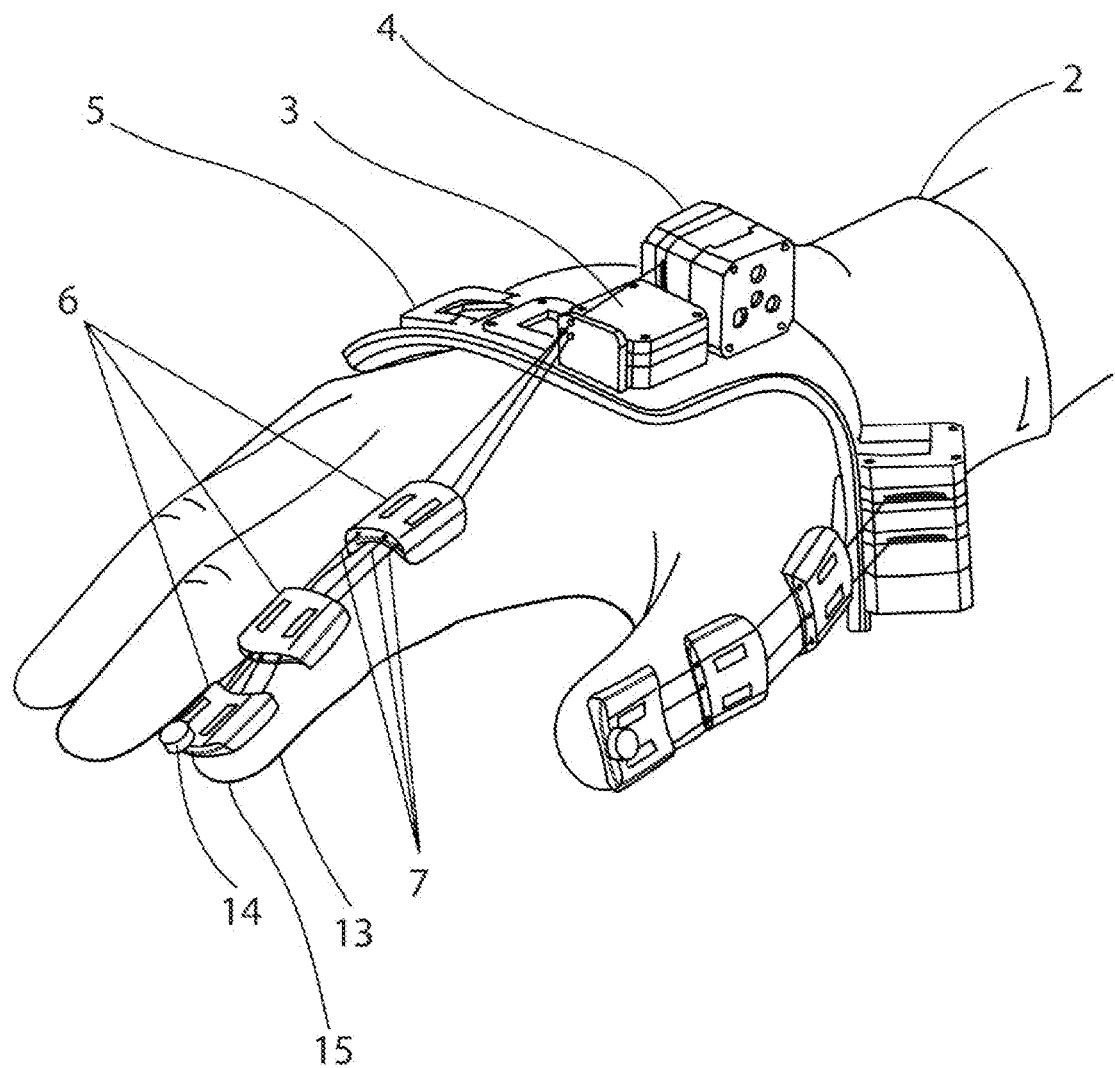
FIG. 1 is an illustration from a perspective view showing assembled parts of the wearable system as a glove system according to an embodiment of the present invention.

Whenever in the figures the same reference numerals are applied, these numerals refer to the same parts.

Figure 2:
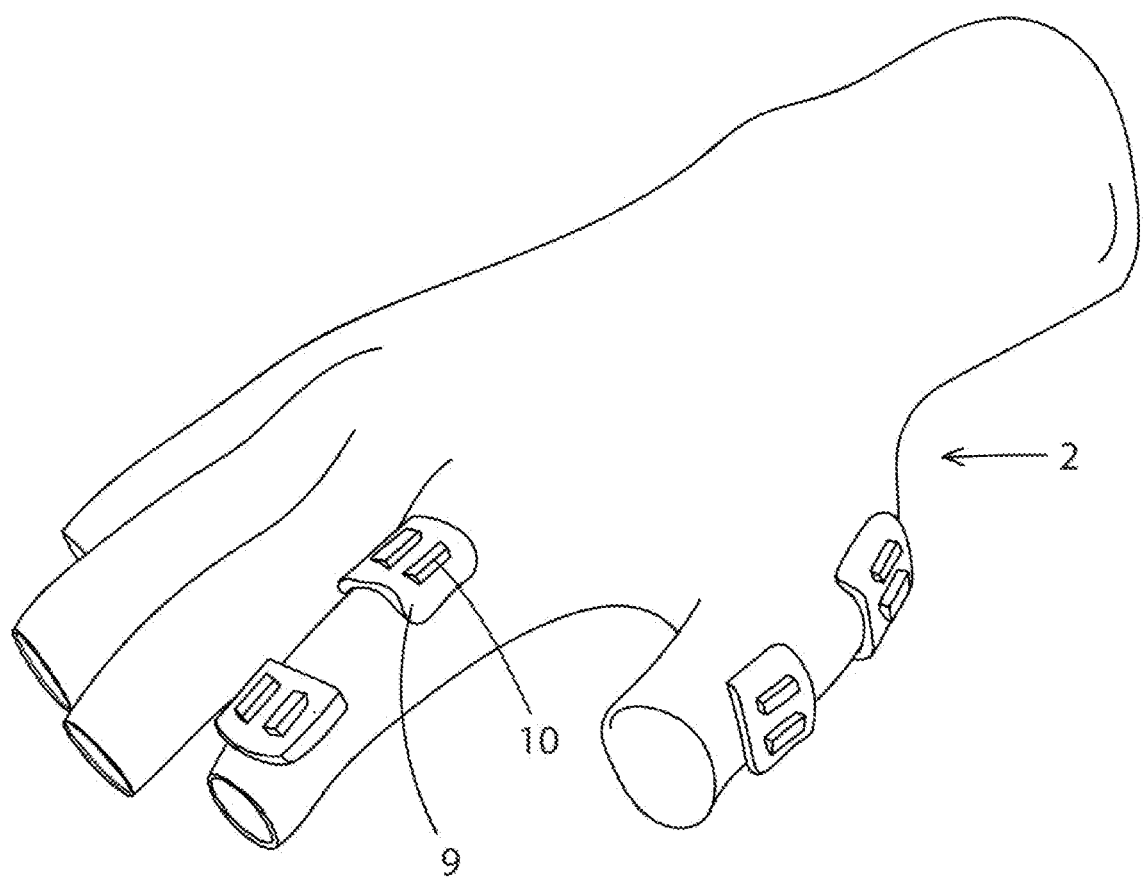
FIGS. 2 and 3 are illustrations from a perspective view separately showing a sleeve-type first wearable part fittable over a user's hand, and at least one second wearable part, the first and the second parts together forming constitutive parts for the wearable system according to an embodiment of the present invention.

FIG. 1 shows notable features of a first embodiment of virtual reality wearable system 1 according to the invention, comprising a wearable part provided with sensor 3 and actuator 4, wherein wearable system 1 comprises a preferably sleeve-type first wearable part 2 fittable over a user's hand, as shown separately in FIG. 2. FIG. 1 further shows at least one second wearable part 5, 6 which is shown separately in FIG. 3. First wearable part 2 and second wearable part 5, 6 are releasably connectable to each other. FIG. 1 shows that at least one second wearable part 5, 6 is wearable over first wearable part 2. It further shows that at least one second wearable part 5, 6 supports sensor 3 and/or actuator 4.

Figure 3:
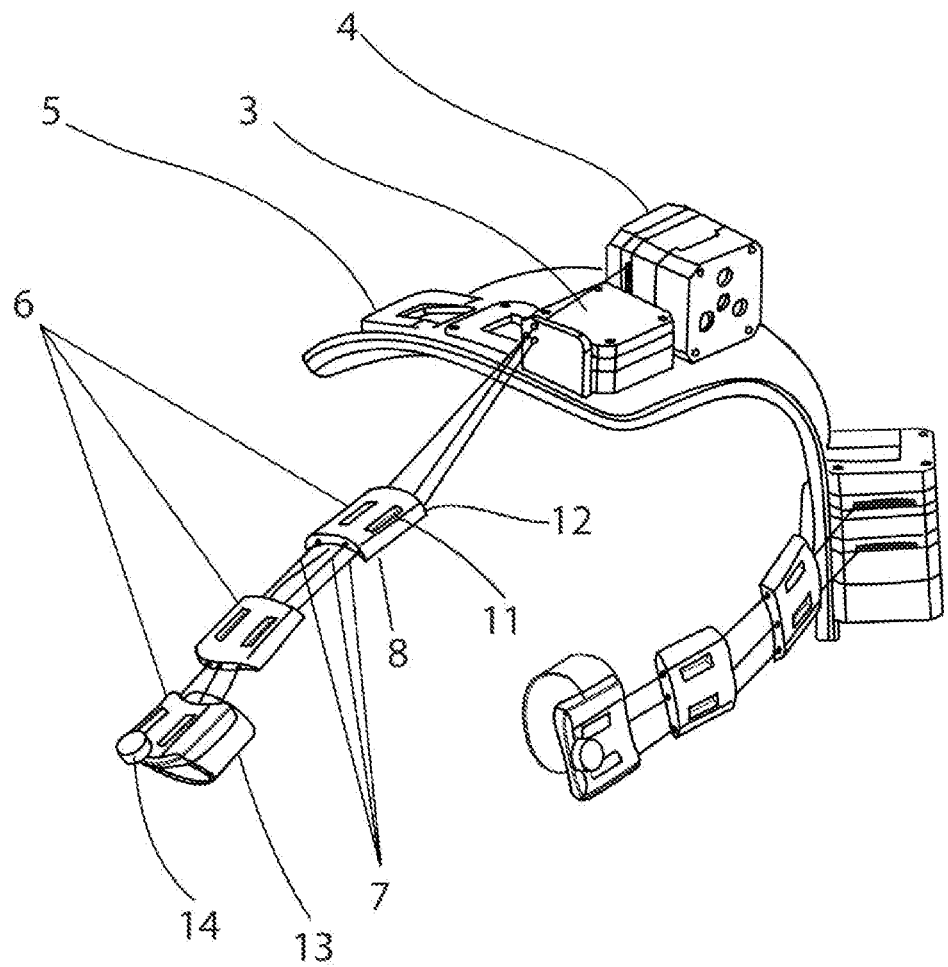

FIG. 1, but more clearly FIG. 3, depicts that the first embodiment of system 1 of the invention comprises a cable or cables 7 connecting sensor 3 and actuator 4 with a portion of second wearable part 5, 6 distant from sensor 3 and actuator 4.

Figure 8:
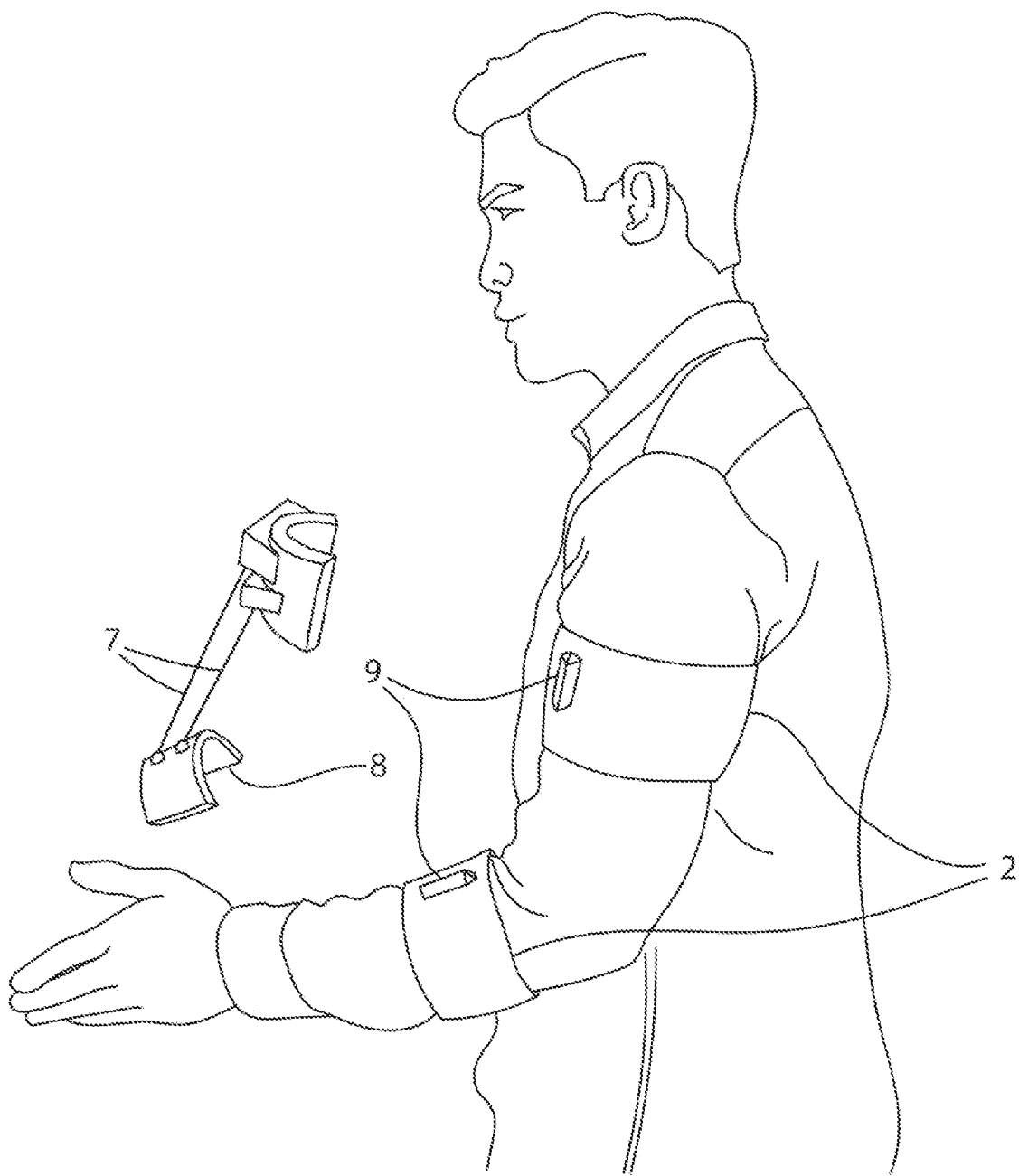
FIGS. 8 and 9 are illustrations from a perspective view showing a wearable system as applied around a user's arm at opposite sides of the elbow, according to an embodiment of the present invention.
Figure 9:
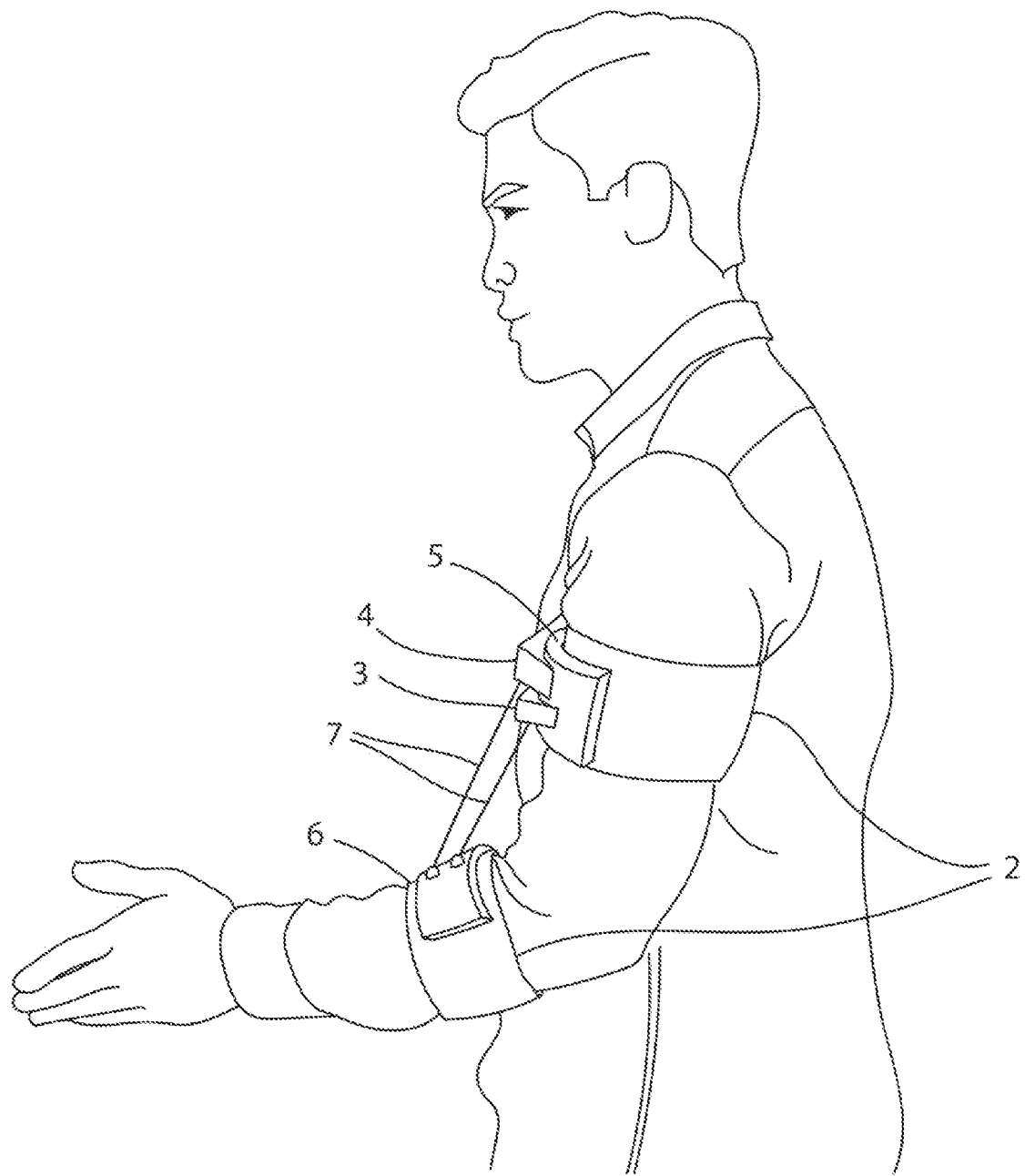

In FIG. 8 and FIG. 9, a second embodiment of a wearable system of the invention is shown, wherein the wearable system comprises sleeve-type first wearable part 2 fittable over a user's arm as shown in FIG. 8, and second wearable part 5, 6 as shown in FIG. 9, wherein first wearable part 2 and second wearable part 5, 6 are releasably connectable to each other. Particularly FIG. 9 shows that wearable system of this second embodiment comprises cable or cables 7 connecting sensor 3 and actuator 4 with a portion of second wearable part 5, 6 distant from sensor 3 and actuator 4.

Turning back to the first embodiment of the wearable system of the invention, particularly FIG. 3 shows clearly that the at least one second wearable part 5, 6 comprises a first portion 5 and a second portion 6, wherein first portion 5 is placeable on the back of a user's hand and said first portion 5 supports sensor 3 and actuator 4. Second portion 6 is placeable on a finger or fingers of the user's hand, wherein cable or cables 7 extend from sensor 3 and actuator 4 on first portion 5 to second portion 6, and connect to second portion 6 near to a location where in use fingertip 15 is positioned. Accordingly, sensor 3 can thus accurately detect flexion of the user's finger or fingers, whereas actuator 4 can be used to provide sensory feedback to the user's finger or fingers.

FIGS. 1 and 3 further show that in this first embodiment of the wearable system of the invention, first wearable part 2 and at least one second wearable part 5, 6 comprise straps 13 arranged for fitting around part of the user's hand.

Figure 4:
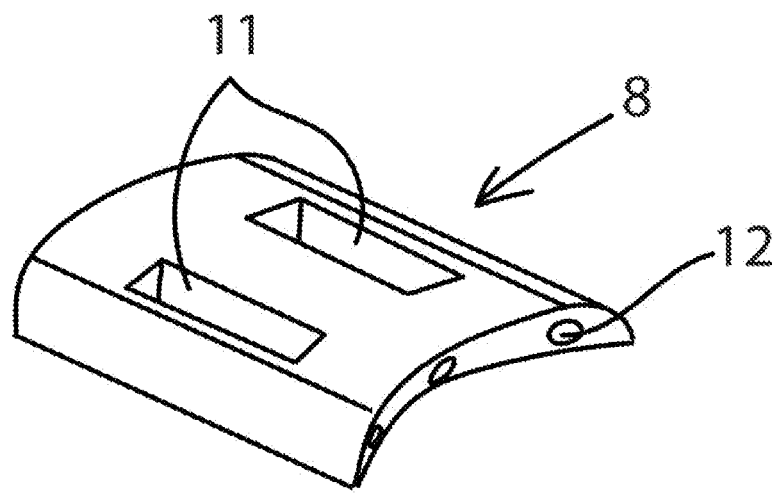
FIGS. 4 and 5 are illustrations from a perspective view separately show attachment parts for assembling a wearable system according to an embodiment of the present invention.
Figure 5:
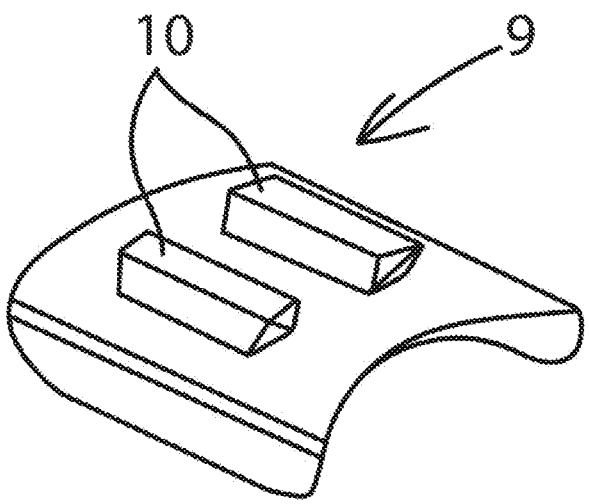
Figure 6:
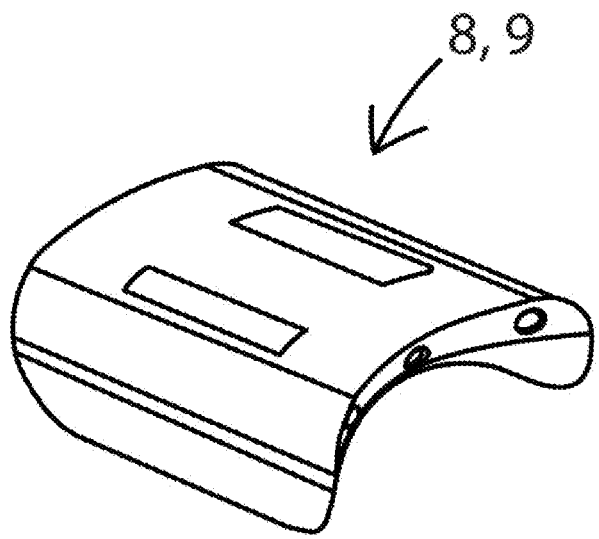
FIGS. 6 and 7 are illustrations from a perspective view showing the attachment parts that are shown separately in FIGS. 4 and 5, now assembled together.
Figure 7:
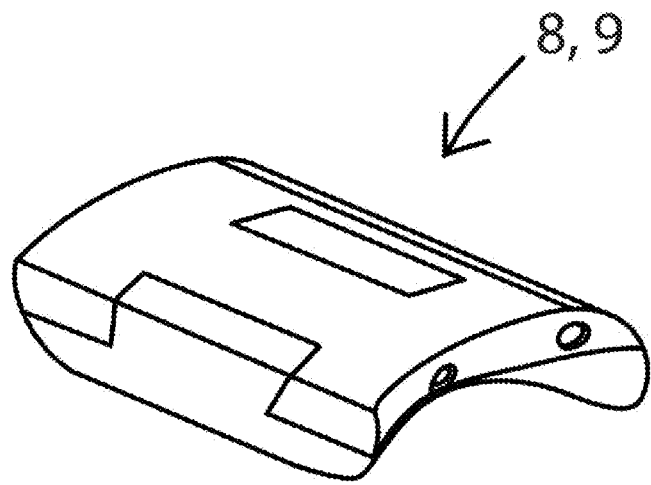

A further beneficial feature of wearable system 1 of the invention, which can apply to each embodiment, is that first wearable part 2 and at least one second wearable part 5, 6 are provided with cooperating attachment parts 8, 9 to enable the releasable attachment of first wearable part 2 and at least one second wearable part 5, 6 to each other. For clarity the cooperating attachment parts 8, 9 are shown in FIGS. 4-7 separate from first wearable part 2 and second wearable part 5, 6. Normally the attachment parts 8, 9 are fixed to the respective wearable parts 2, 5, 6. FIG. 4 shows an example of attachment part 8 which is normally fixed to at least one second wearable part 5, 6, whereas FIG. 5 shows attachment part 9 which is normally fixed to first wearable part 2. FIGS. 6 and 7 show the respective attachment parts 8, 9 when they are attached to each other in different opposing side views.

Most clearly shown in FIGS. 4 and 5, is that the cooperating attachment parts 8, 9 comprise protrusions 10 and recesses 11 that are both dimensioned to snugly fit into each other. The cooperating attachment parts 8, 9 preferably provide a shape locked connection between said parts.

Best shown in FIG. 3 is that the cooperating attachment parts 8, 9 are provided with guiding grooves 12 for receiving and slidably guiding the cables 7.

FIGS. 1 and 3 show that electronic device 14 is positioned on at least one second wearable part 5, 6, wherein cable or cables 7 are electrically conducting and said electronic device 14 is electrically connected to the cable or cables 7 so as to power the electronic device 14.

The invention has been discussed in the foregoing with reference to an exemplary embodiment of a virtual reality wearable system according to the invention. The invention is however not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A virtual reality wearable system comprising:
   a sensor;
   an actuator;
   a sleeve-type first wearable part fittable over a user's bodily part;
   at least one second wearable part wearable over the first wearable part, the at least one second wearable part comprising a first portion and a second portion;
   the first portion placeable on a first bodily part of a user;
   the first portion supporting the sensor and the actuator;
   the second portion placeable on a second bodily part of the user distant from the first bodily part;
   the first wearable part and the second wearable part releasably connectable to each other;
   a cable or cables connecting the sensor and the actuator with a portion of the second wearable part distant from the sensor and the actuator;
   the cable or cables extending without connection to the first wearable part from the sensor and the actuator on the first portion of the second wearable part to the second portion of the second wearable part;
   an electronic device positioned on the at least one second wearable part;
   the cable or cables electrically conducting; and
   the electronic device electrically connected to the cable or cables so as to power the electronic device.

2. The virtual reality wearable system according claim 1, wherein the first portion is placeable on the back of a user's hand and the first portion supports the sensor and the actuator, and the second portion is placeable on a finger or fingers of the user's hand, wherein the cable or cables extend from the sensor and the actuator on the first portion to the second portion which in use is on a finger or fingers of the user's hand, and connect to the second portion near to a location where in use a fingertip is positioned.

3. The virtual reality wearable system according to claim 1, wherein the first wearable part and the at least one second wearable part are provided with cooperating attachment parts to enable the releasable attachment of the first wearable part and the at least one second wearable part to each other.

4. The virtual reality wearable system of claim 3, wherein the cooperating attachment parts comprise protrusions and recesses that are both dimensioned to snugly fit into each other.

5. The virtual reality wearable system of claim 3, wherein the cooperating attachment parts provide a shape locked connection between said parts.

6. The virtual reality wearable system according to claim 3, wherein the cooperating attachment parts comprise guiding grooves for receiving and slidably guiding the cables.

7. The virtual reality wearable system according to claim 1, wherein the first wearable part and the at least one second wearable part comprise straps arranged for fitting around part of the user's hand.

* * * * *